United States Patent [19]
Ikari et al.

[11] 4,451,129
[45] May 29, 1984

[54] CAMERA HAVING A PLURALITY OF BUILT-IN LENSES

[75] Inventors: Hideo Ikari; Michio Hirohata, both of Tokyo, Japan

[73] Assignee: Canon Kabushiki Kaisha, Tokyo, Japan

[21] Appl. No.: 352,855

[22] Filed: Feb. 26, 1982

[30] Foreign Application Priority Data

Mar. 5, 1981 [JP]  Japan ................................ 56-31886
Mar. 5, 1981 [JP]  Japan ................................ 56-31887

[51] Int. Cl.³ ............................................. G03B 7/00
[52] U.S. Cl. .............................. 354/477; 354/195.12
[58] Field of Search ............................. 354/59, 197

[56] References Cited

U.S. PATENT DOCUMENTS

| 3,836,934 | 9/1974 | Suzuki et al. | 354/197 |
| 3,887,930 | 6/1975 | Bresson | 354/197 |
| 4,214,829 | 7/1980 | Ohashi | 354/197 |
| 4,264,175 | 4/1981 | Hayata et al. | 354/197 |
| 4,279,493 | 7/1981 | Kobayashi | 354/197 |

FOREIGN PATENT DOCUMENTS 54-162538 12/1979 Japan .
54-162541 12/1979 Japan .
54-162544 12/1979 Japan .
54-163545 12/1979 Japan .

*Primary Examiner*—Russell E. Adams
*Attorney, Agent, or Firm*—Toren, McGeady and Stanger

[57] ABSTRACT

A camera having two built-in lenses with selective control of the focal length, wherein a first focal length is obtained by the first lens optical system and, after the first lens optical system has been moved along a lens axis without causing movement of a device for receiving light from an object to be photographed, the second lens optical system is moved to a composite position with the first lens optical system so that a second focal length is obtained by the first and second lens optical systems.

17 Claims, 7 Drawing Figures

CAMERA HAVING A PLURALITY OF BUILT-IN LENSES

BACKGROUND OF THE INVENTION

1. Field of the Invention

This invention relates to a camera having built therein a master lens system and a supplementary lens system and capable of operating selectively with the master lens system alone and with a composite optical system of said master and said supplementary lens systems while maintaining a photosensitive element stationary despite the change of the focal length due to the interchange of the lens systems.

2. Description of the Prior Art

In connection with the technique of varying the focal length by providing a plurality of objective lenses in the interior of the camera and selectively positioning these objective lenses onto the optical axis of the exposure aperture which constitutes one of the technical subjects of the invention, a wide variety of proposals have been known in the prior art.

U.S. Pat. No. 4,104,663 to Yamazaki discloses that the objective lenses are arranged upon interchanging to require a changeover between view finder optical systems.

Also U.S. Pat. No. 4,038,673 to Schroder discloses a mechanism for interchanging the objective lens system in part by operating a slider.

Such optical systems involving interchanging of the objective lens by a standard lens or a telephoto lens, and interchanging of a portion of the optical system have found use in so-called 110 type cameras and other compact cameras of small size with the mechanisms also being amenable to easy production techniques and with the requirement for accuracy of exposure control being relatively moderate.

SUMMARY OF THE INVENTION

A principal object of the present invention is to provide a camera having a plurality of lenses with means rendering it possible to change over between focal lengths by the movement of first and second photo-taking lenses independently of each other or in combination, whereby after the first photo-taking lens has been moved in a direction parallel to the optical axis, the second photo-taking lens is brought to a point or position behind the first photo-taking lens in optical alignment, particularly characterized in that without the necessity for shifting the shutter mechanism and the electrical circuit mechanism, changing of the focal length can be carried out.

A second object of the present invention is to control the axially directed movement of the first photo-taking lens followed by the arrangement of the second photo-taking lens onto the optical axis by the use of a simple mechanism and, upon consideration of the application of the present invention even to lens shutter-equipped 35m/m cameras, focal plane cameras and other middle class cameras, to provide a structure in which quick change in position of the photo-taking lenses can be performed by a motor driving mechanism.

A further object of the present invention is to compensate for a change in the incident light on the photosensitive element of the object brightness level measurement means which results from the change of the focal length as the first and second photo-taking lenses are combined to form a composite optical system, in automatic response to the aforesaid change of the focal length.

BRIEF DESCRIPTION OF THE DRAWINGS

FIG. 5 is a plan view of the control mechanism in an operative position where the first and second lens systems are optically aligned with each other to obtain a second focal length.

FIG 6. is a plan view of the control mechanism during movement between the positions of FIGS. 4 and 5.

DESCRIPTION OF THE PREFERRED EMBODIMENT

Figure 1:
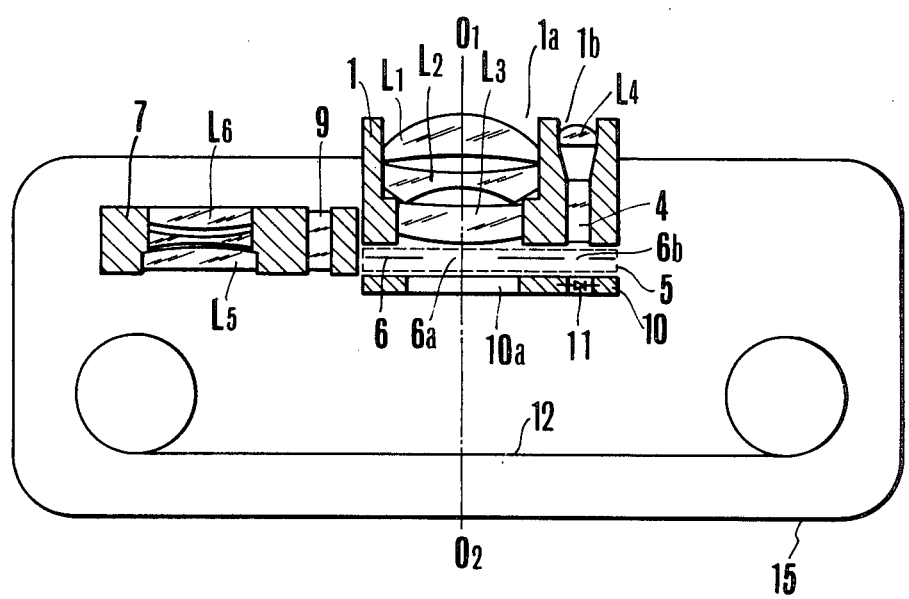
FIG. 1 is a sectional view of the main parts of a camera operating with a first lens system alone.
Figure 2:
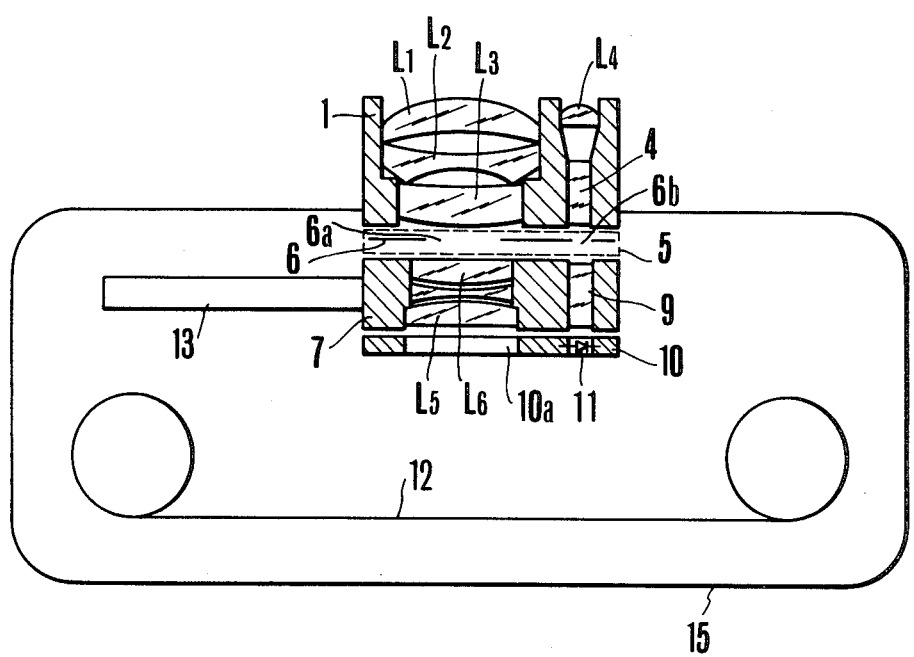
FIG. 2 is a similar view of the camera operating with a composite optical system of the first lens system and a second lens system.
Figure 3:
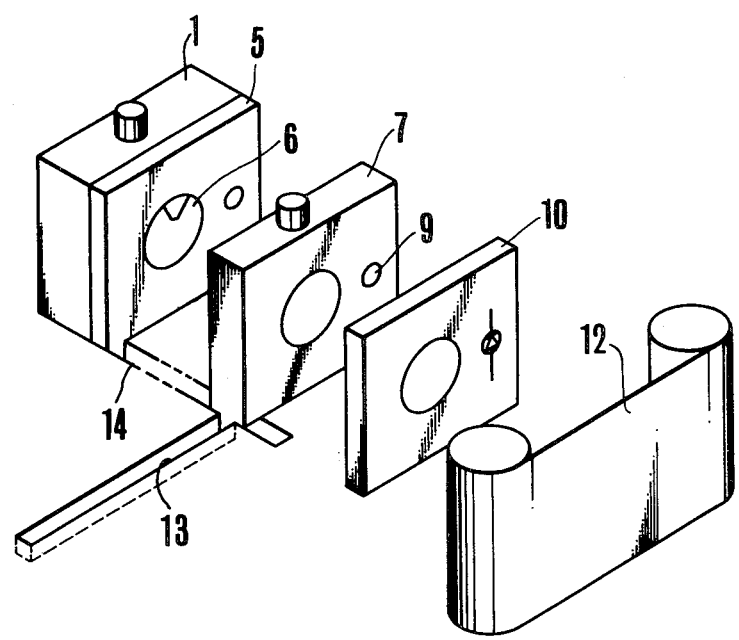
FIG. 3 is a perspective view illustrating a manner in which the second lens system is moved.

FIGS. 1 to 3 illustrate the optical arrangement of the present invention where a master lens system comprising elements $L_1$ to $L_3$ is held in a cell 1 having a first opening 1a with the center at an optical axis $O_1$–$O_2$ and a second opening 1b spaced apart from said first opening and movable back and forth along the lens axis. The holder member 1 and lens system $L_1$–$L_3$ form a first photo-taking lens means. $L_4$ is a collector lens for light metering held in the second opening 1b of the master lens system holder member 1. 4 is a first light guide for conducting the collected light by the lens $L_4$ to a photosensitive element. A shutter unit 5 shown in dashed line is axially movable in unison with the master lens system. Shutter diaphragm blades 6 define a main aperture opening 6a capable of adjusting the exposure amount and an auxiliary aperture opening 6b for light metering. 7 is a holder member of $L_5$ and $L_6$ constituting a supplementary lens system, the holder member 7 and lens elements $L_5$ and $L_6$ forming a second photo-taking lens means which is arranged to be movable between a first position outside the optical path of the master lens system $L_1$–$L_3$ illustrated in FIG. 1 and a second position illustrated in FIG. 2 where the second photo-taking lens means lies in a space between the first photo-taking lens means and a circuit portion 10 to be described later in optical alignment with each other at the axis $O_1$–$O_2$.

9 is a second light guide provided in the supplementary lens system holder and forming an extended optical path of such dimension that when the supplementary lens system holder is in the second position (FIG. 2), it is positioned behind the first light metering optical path $L_4$, 4 of the master lens system holder, and a photosensitive element subtends a narrower field coverage than when the supplementary lens system holder is in the first position (FIG. 1) so that the ratio of the light metering area to the entire area of the image format by the master lens system $L_1$–$L_3$ becomes the same as that of the light metering area to the entire area of the image format by the composite optical system of the master lens system and the supplementary lens system.

10 is a circuit portion having a print plate on which is applied a circuit for exposure control, having and opening 10a in alignment with the image bearing light path, and fixedly mounted to a camera housing 15.

11 is a light metering photo-sensitive element arranged in said circuit and located behind the light metering optical path to remain stationary when the focal length is changed by the movement of the first photo-taking lens means and the second photo-taking lens means. 12 is a film. 13 is FIG. 2 is a first guide groove for the supplementary lens system holder as it moves between the first and second positions. 14 in FIG. 3 is a second guide groove for the master lens system holder as it moves axially.

In a case where photography is effected with the objective lens system consisting of the master lens system $L_1$–$L_3$ alone, the arrangement of FIG. 1 is maintained so that the master lens system is rearwardly followed by the shutter unit 5 with the main diaphragm which is in turn rearwardly followed by the opening 10a in the print plate, which is in turn rearwardly followed after an adequate space by the film 12. The supplementary lens system holder 7 is set aside in the illustrated position of FIG. 1 outside the image bearing light path of the master lens system. Thus, the establishment of such an arrangement renders it possible to operate the camera with its photo-taking lens system having a first focal length. For automatic exposure adjustment by the photosensitive element, the collector lens $L_4$ receives light from a predetermined relative angular field to the total angular field coverage of the photo-taking lens system, and the collected light is conducted through the first light guide 4 to the auxiliary diaphragm 6b, reaching the photosensitive element 11. Responsive to the output of the photosensitive element 11, the circuit portion 10 derives and exposure value.

Next, to establish the composite optical system of the master lens system and supplementary lens system in the illustrated position of FIG. 2, the master lens system holder and the shutter unit 5 are axially moved forwards as a unit along the second guide groove 14, and then the supplementary lens system holder is moved to the right along the first guide groove 13 until the second position of FIG. 2 is reached between the shutter unit 5 and the circuit portion 10. With such an arrangement, the camera is rendered operative with the selection of a second focal length by the composite photo-taking lens system of the master lens system and the supplementary lens system. The light to the photosensitive element is obtained by the collector lens $L_4$ with the collected light after having passed through the auxiliary diaphragm 6b being directed through the second light guide 9 in the supplementary lens system holder so that the part of the collected light by the lens $L_4$ which has larger angles of incidence does not enter the second light guide 9 so that the ratio of the angular field coverage of the photosensitive element to that of the master lens system alone is made to be the same as that of the reduced angular field coverage of the photosensitive element to that of the combined lens system of the master lens system and supplementary lens system. Thus, the light emerging from the second light guide 9 is suited to derive a correct exposure value for the optical arrangement of FIG. 2 by the circuit portion. It will be appreciated that the deviation of the exposure value resulting from the change in F-number at the same size of auxiliary diaphragm aperture due to the change of the focal length is automatically corrected by maintaining the constant ratio of the angular field coverage of the light meter to that of the photo-taking lens system during the changing over of the focal length.

Next, with reference to FIGS. 4 to 7, there is shown a mechanism for moving the first photo-taking means 1 and shutter unit 5 axially from the position of FIG. 1, while the second photo-taking lens means 7 is moved to and positioned in the space between the first photo-taking lens means-and-shutter unit 5 and the circuit portion 10.

Figure 4:
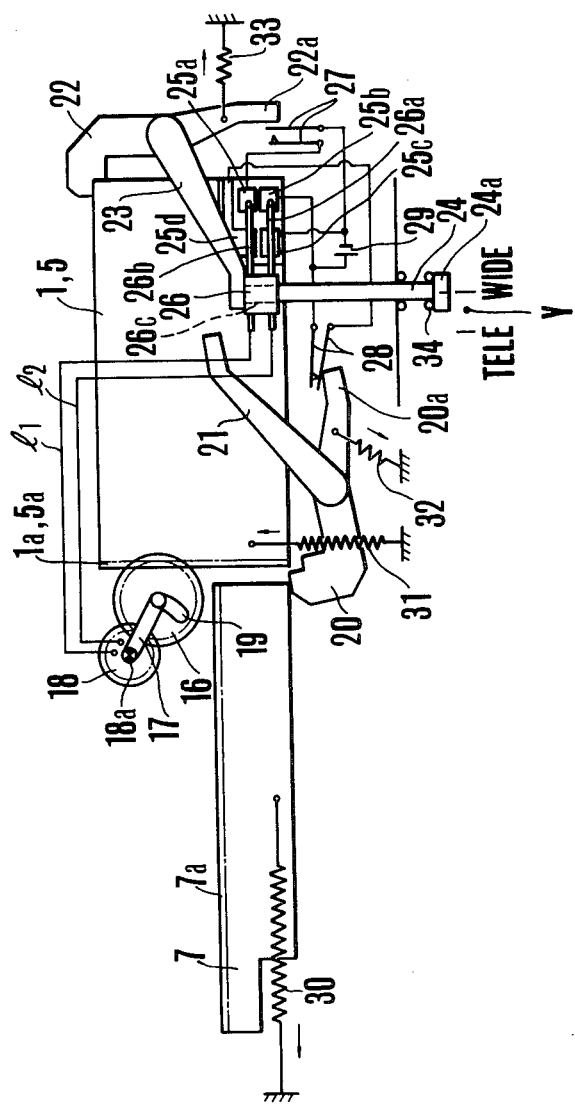
FIGS. 4 to 6 are schematic diagrams which illustrate a mechanism for controlling the movement of the various lens systems with FIG. 4 being a plan view illustrating an operative position where a first focal length is obtained.
Figure 5:
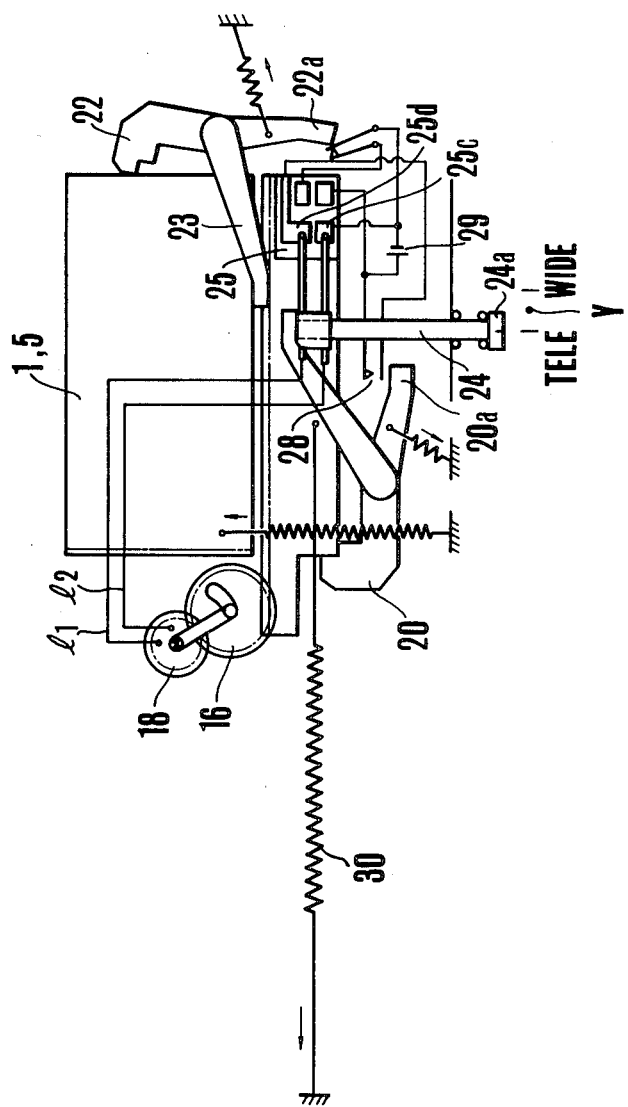
Figure 6:
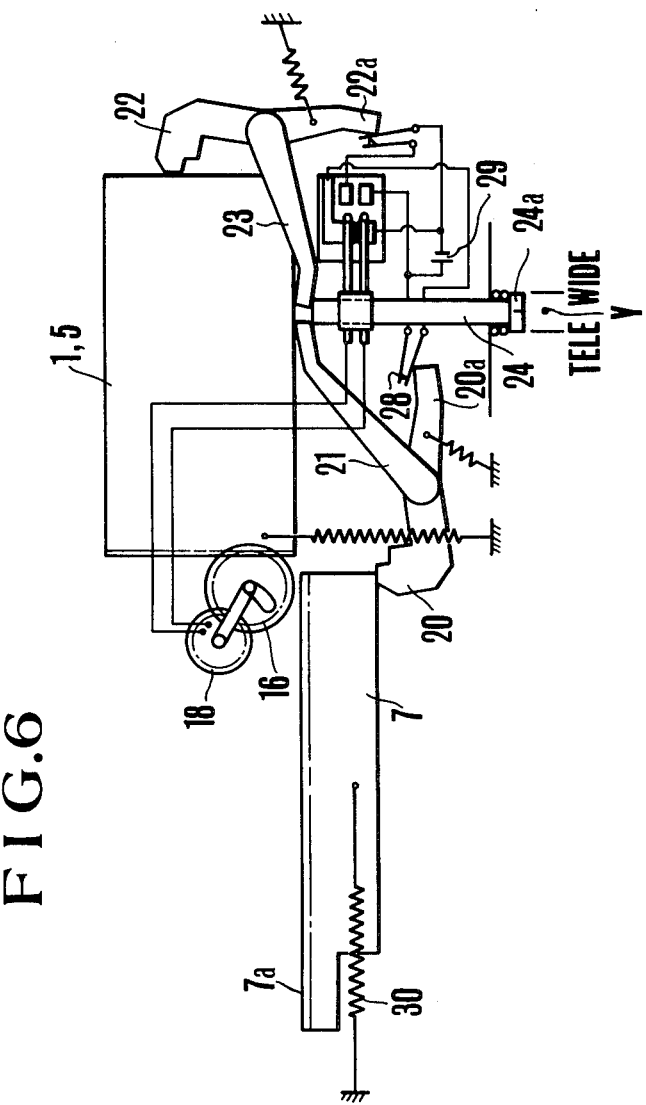

In FIGS. 4 to 6, the first and second photo-taking lens means 1 and 7 are indicated respectively in block form with the lens systems omitted, and further the first photo-taking means 1 and the shutter unit 5 are represented by a common block.

Formed in one side of the first photo-taking lens means 1, shutter unit 5 and the second photo-taking lens means 7 are racks 1a, 5a and 7a respectively which are selectively engaged with a gear 16. 17 is a meshing changeover lever pivotally mounted on a shaft 18a and carrying the gear 16 at the opposite end.

18 is a drive gear meshing with the gear 16 to transmit motion of an electric motor (not shown). The gear 18 is a sun gear with the gear 16 being a planetary gear. 19 is a cling-preventing guide groove for limiting the shaft of the gear 16 so as to prevent cling of the gear 16.

20 is a latch member for latching the second photo-taking lens means 7 when it is in the longer focal length position. 21 is a first latch release lever fixed to the latch member 20. 22 is a latch member for latching the first photo-taking lens means 1 when the master lens system is in the shorter focal length position. 23 is a second latch release lever fixed to the latch member 22. 24 is a latch release rod having a button portion 24a projected outwardly of the camera body surface which operates upon depression of the button portion 24a to push the first or second release lever 21 or 23 so that the first or second latch member 20 or 22 ceases to latch, and slidingly movable to the left or right between a WIDE-designated position and a TELE-designated position. 25 is a print plate having electrically conductive patterns 25a, 25b, 25c and 25d against which are pressed switch contacts 26a and 26b so that as a contact supporter 26 is slidingly moved to the left or right along with the latch release rod 24, the current supply from a battery 29 through switches 27 and 28 to the motor (not shown) from which motion is transmitted to the drive gear 18 is controlled to effect forward rotation, stoppage and reversed rotation selectively. The contact supporter 26 has a grooved portion or penetrated hole 26c in which is engaged the latch release rod 24 so that it follows the leftward or rightward movement of the release rod 24, but is restrained from back-and-forth movement.

Figure 7:
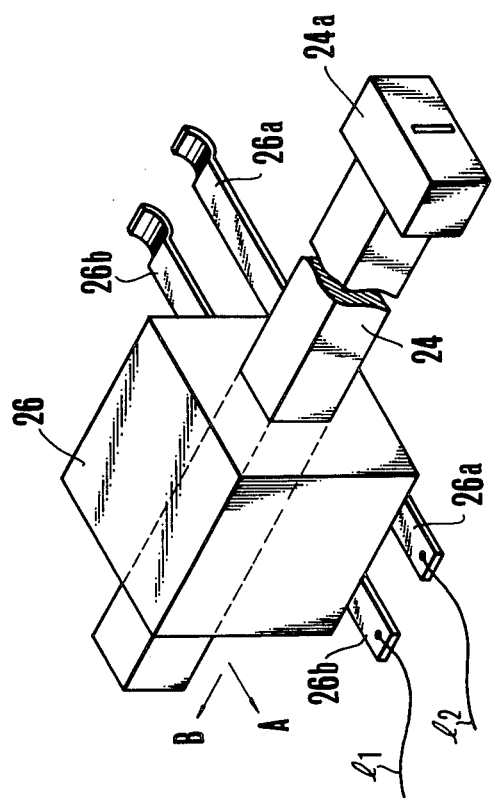
FIG. 7 is a perspective view of the connecting mechanism for a latch releasing rod cooperative with a control knob and a switch contact-supporting block.

FIG. 7 illustrates the structure of the contact supporter 26 and the latch release rod 24. The contact supporter 26 is in the form of a cube made of an electrically insulating resin material, and has a through hole formed at the center thereof through which the latch release rod 24 penetrates. The contacts 26a and 26b are fixed to the supporter 26. The supporter 26 is held on a base plate (not shown) and arranged to be movable in directions indicated by arrow A along with the latch release rod 24 for the purpose of changing the positions of the contacts 26a and 26b relative to the electrically conductive pattern and to be restrained from movement in directions indicated by arrow B, while permitting only the latch release rod 24 to be slidingly moved as it passes through the hole 26c.

30 is a tension return spring urging the second photo-taking lens means 7 sidewards from the optical axis to the position which is taken when the shorter focal length is set. 31 is a compression return spring urging the first photo-taking lens means towards the longer focal length position. 32 is a first latching spring urging the latch member 20 in a clockwise direction. 33 is a second latching spring urging the latch member 22 in a counterclockwise direction. 34 is a compression return spring urging the release rod 24 towards the rear. 11 and 12 are lead wires connecting the respective terminals of the contact supporter 26 controlling the operation of the switches 27 and 28 with the ends of a winding of the motor.

The operation of the moving mechanism of such construction is described below by reference to FIGS. 4 to 6 wherein FIG. 4 represents the setting of only the first photo-taking lens means on the camera for the short focal length, FIG. 5 represents the setting of the first and second photo-taking lens means 1 and 7 in optical alignment on the camera for the long focal length, and FIG. 6 represents a phase of transition from the short to the long focal length.

In FIG. 4, the lead wire 11, contact 26b, electrically conductive patch 25a, switch 27, battery 29, electrically conductive patch 25b, contact 26a, lead wire 12 and motor form a current supply circuit.

When it is desired to change over from the short to the long focal length, the operator first pushes the latch release rod button 24a in the position of FIG. 4, whereby the second latch release lever 23 and the latch member 22 for the master lens system are turned in the clockwise direction to release the first photo-taking lens means 1 from the latching connection with the latch member 22, and at the same time the switch 27 is closed by the end portion 22a of the latch member 22 to supply the motor (not shown) with current. Therefore, the drive gear 18 rotates in the counterclockwise direction. Then, while keeping the button 24a in the depressed position, the operator slidingly moves it to the left. Upon attainment of an intermediate position in registry with an index Y between the index WIDE and the index TELE, there occurs a switching off to terminate the duration of energization of the motor, and the first photo-taking lens means 1 is driven by the force of the compression return spring 31 to move forwards. As illustrated in FIG. 6, therefore, the prescribed space is created between the first photo-taking lens means-and-shutter unit 5 and the circuit portion 10. Then when the button 24a is further moved to the left and placed in registry with the index TELE, a current supply circuit to the motor is closed comprising the lead wire 11, contact 26b, electrically conductive patch 25d, switch 28, battery 29, electrically conductive patch 25c, contact 26a, and the lead wire 12. Since at this time, the direction of current flowing through the winding of the motor is reverse to that when in the WIDE position, the drive gear 18 rotates in the clockwise direction, and, therefore, the gear 16 rotates in the counterclockwise direction, thus being taken out of engagement with the racks 1a and 5a. After a pivoting movement about the shaft 18a in the clockwise direction, the gear 16 is brought into engagement with the rack 7a of the second photo-taking lens means 7 which is moved to the right while charging the tension return spring 30. After the button 24a has reached the position labelled TELE, it may be released as the current supply to the motor is controlled by the switch 28 not by the switch 27. As movement of the second photo-taking lens means advances, when the supplementary lens system is positioned just behind the master lens system, the supplementary lens system latching member 20 is turned in the clockwise direction to engage the second photo-taking lens means 7 and the switch 28 is turned off to cut off the current supply to the motor, thus establishing the arrangement for the long focal length of FIG. 5.

When it is desired to change over from the long focal length to the short focal length, the operator needs only to perform a similar operation to the above but in the reversed direction. In other words, the latch release rod button 24a while being pushed is slidingly moved to the right. When in the intermediate position between the TELE and WIDE positions, the second photo-taking lens means 7 is moved to the left under the action of the tension return spring 30. Then when the button 24a has reached the WIDE position, the motor is energized in a direction to rotate the drive gear 18 in the counterclockwise direction. As the gear 16 rotates in the clockwise direction, it revolves round the shaft 18a in the counterclockwise direction, whereby it is brought into engagement with the racks 1a, 5a. Then, the master lens system holder member 1 is retracted while charging the compression return spring. Upon engagement with the latch member 22, the switch 27 is turned off to de-energize the motor, thus establishing the arrangement for the short focal length illustrated in FIG. 4.

The present invention provides advantages which, among others, include that the change in focal length is associated with a change in the angular field of coverage of the photosensitive element for exposure adjustment thereby to maintain a constant metering area ratio over the entire area of the image format, thereby making it possible to automatically compensate for shift of the exposure value resulting from change in the F-number despite the fact that the size of diaphragm aperture opening is left unchanged.

Another advantage is that, because the exposure value shift compensation is made by changing the light arrangement for the photosensitive element, there is no need to modify the light metering circuit according to the change of the focal length.

Another advantage is that since change of the light arrangement is made by providing an extension optical path, the position of the photosensitive element is maintained unchanged both before and after the focal length is changed, so that production and assembly of cameras in accordance with the invention can be performed economically. Furthermore, since the need for modifying means which would otherwise be necessary to determine the size of the aperture opening by the output of the light metering circuit is omitted, the structure is simplified.

What is claimed is:

1. A camera having a plurality of built-in lenses and capable of selective operation at different focal lengths, comprising:
   (a) at least first and second photo-taking lenses for enabling selection of different focal lengths,
   (b) photosensitive means for converting light from an object to be photographed to an electrical signal;
   (c) first light guide means for conducting the light from the object to said photosensitive means; and (d) second light guide means for conducting light emerging from said first light guide means to said photosensitive means when the focal length due to the combination of said first and said second photo-taking lens means is selected.

2. A camera according to claim 1, wherein said second light guide means includes means for adjusting the amount of light transmitted in order to adjust the amount of light incident upon said photosensitive means in correspondence to change of a maximum aperture opening in accordance with change of the focal length due to the combination of said photo-taking lenses.

3. A camera operating with selection of combinations of a plurality of photographic lenses to have a choice of a plurality of focal lengths, comprising
 (a) first photographic lens means movable for changing the focal length;
 (b) second photographic lens means movable for changing over the focal length in cooperation with said first photographic lens means; and
 (c) electrically operated drive means comprising a drive source and drive means receptive of a driving force of said drive source for moving said second photographic lens means into, and out of, a photographic light path.

4. A camera according to claim 3 wherein said first photographic lens means moves axially, and said second photographic lens means moves in directions perpendicular to an optical axis thereof.

5. A camera according to claim 3 wherein said drive means comprises gear means rotatable by the driving force from said drive source and a driving torque transmission circuit, said gear means being arranged to be engageable with said first photographic lens means and said second photographic lens means.

6. A camera according to claim 5 further including changeover means positioned in said driving torque transmission circuit to reverse the direction of rotation of said gear means in response to changing operation of said first photographic lens means.

7. A camera according to claim 3 further including:
 (a) actuating means for a changing over operation of the focal length of said camera;
 (b) a first latch member for holding said first photographic lens to establish a focal length by said first photographic lens only; and
 (c) a second latch member for holding said second photographic lens to establish a combined focal length of said first and said second photographic lenses.

8. A camera according to claim 7 wherein said actuating means is made movable in directions parallel to and perpendicular to the optical axis, whereby when said actuating means is moved in the axial directions, said first latch member is released from the latching connection, and when said actuating means is moved in directions perpendicular to the optical axis, said changeover means is rendered operative.

9. A camera with a selection of combinations of a plurality of photographic lenses to have a choice of a plurality of focal lengths, comprising:
 (a) first photographic lens means movable for changing the focal length;
 (b) second photographic lens means movable between a first position and a second position to change the focal length in cooperation with said first photographic lens;

(c) light metering means for deriving an exposure value; and
(d) exposure correcting means movable forwardly and rearwardly on an optical path of said light metering means in response to change of said focal length.

10. A camera according to claim 9 wherein said exposure correcting means is a means for correcting the angle of incidence of light on said light metering means so that the angle of incidence is in predetermined relation to the change in the focal length.

11. A camera according to claim 9 further including electrically operated drive means responsive to changing of the focal length for moving said exposure correction means automatically.

12. A camera operating with selection of combinations of a plurality of photographic lenses to have a choice of a plurality of focal lengths, comprising:
 (a) first photographic lens means movable for selecting a focal length;
 (b) second photographic lens means movable between a first position and a second position to select another focal length in cooperation with said first photographic lens means; and
 (c) exposure control means movable along an optical axis in response to said focal length selecting operation.

13. A camera according to claim 12 wherein said exposure control means responsive to said focal length selecting operation moves in unison with said first photographic lens means.

14. A camera according to claim 12 further including light metering means for deriving an exposure value; and auxiliary diaphragm means for controlling the amount of light entering said light metering means, wherein said auxiliary diaphragm means moves in response to focal length selecting operation.

15. A camera having a plurality of photo-taking lenses and capable of operation selectively with one of said lenses, or with two of said lenses in combination, comprising:
 first photo-taking lens means movable in a direction parallel to or along a lens axis;
 exposure control means;
 second photo-taking lens means movable into a space between said first photo-taking lens means and said exposure control means, said second photo-taking lens means being arranged to be movable between a first position and a second position in order to change the focal length of the camera in cooperation with said first photo-taking lens means; and
 actuating means for inserting said second photo-taking lens means into said space, said actuating means having operating means for changing the focal length of said camera and driving means for moving said second photo-taking lens means from said first position to said second position;
 said actuating means further including first bias means urging said first photo-taking lens means in a direction, first latch means for latching said first photo-taking lens means in a predetermined position, second bias means urging said second phototaking lens means in a predeteremined direction, second latch means for latching said second phototaking lens means in a predetermined position, and motorized drive means comprising electric motor and gear means wherein the driving force of said gear means is transmitted to said second photo-taking lens means so that said second photo-taking lens means is moved from said first position to said second position.

16. A camera according to claim 15, wherein said actuating means further includes:
    (a) changeover means for changing the current supply to said motor,
    said changeover means having switching means responsive to operation of said operating member for enabling change over of the current supply to said motor.

17. A camera having a plurality of photo-taking lenses and capable of operation selectively with one of said lenses, or with two of said lenses in combination, comprising:
    first photo-taking lens means movable in a direction parallel to or along a lens axis; exposure control means;
    second photo-taking lens means movable into a space between said first photo-taking lens means and said exposure control means, said second photo-taking lens means being arranged to be movable between a first position and a second position in order to change the focal length of the camera in cooperation with said first photo-taking lens means;
    actuating means for inserting said second photo-taking lens means into said space, said actuating means having operating means for changing the focal length of said camera and driving means for moving said second photo-taking lens means from said first position to said second position; and
    object brightness measuring means comprising a photosensitive element arranged in a predetermined position within said camera and first and second light conducting means for conducting light from an object to be photographed to said photosensitive element, said first light conducting means being held on said first photo-taking lens means, and said second light conducting means being held on said second photo-taking lens means.

* * * * *